United States Patent
Kanso et al.

(10) Patent No.: US 9,104,466 B2
(45) Date of Patent: Aug. 11, 2015

(54) COMPARING REDUNDANCY MODELS FOR DETERMINATION OF AN AVAILABILITY MANAGEMENT FRAMEWORK (AMF) CONFIGURATION AND RUNTIME ASSIGNMENT OF A HIGH AVAILABILITY SYSTEM

(71) Applicants: Ali Kanso, Ville Saint-Laurent (CA); Maria Toeroe, Montreal (CA)

(72) Inventors: Ali Kanso, Ville Saint-Laurent (CA); Maria Toeroe, Montreal (CA)

(73) Assignee: Telefonaktiebolaget L M Ericsson (publ) (SE)

( * ) Notice: Subject to any disclaimer, the term of this patent is extended or adjusted under 35 U.S.C. 154(b) by 180 days.

(21) Appl. No.: 13/967,862

(22) Filed: Aug. 15, 2013

(65) Prior Publication Data

US 2014/0053158 A1  Feb. 20, 2014

Related U.S. Application Data

(60) Provisional application No. 61/683,639, filed on Aug. 15, 2012.

(51) Int. Cl.
*G06F 11/00* (2006.01)
*G06F 9/46* (2006.01)
*G06F 11/20* (2006.01)
*H04L 12/24* (2006.01)

(52) U.S. Cl.
CPC ........... *G06F 9/46* (2013.01); *G06F 11/008* (2013.01); *G06F 11/202* (2013.01); *H04L 41/5038* (2013.01); *H04L 41/5009* (2013.01)

(58) Field of Classification Search
CPC .................................................. G06F 11/202
USPC ................. 714/1, 2, 47.1, 47.2, 47.3, 48
See application file for complete search history.

(56) References Cited

U.S. PATENT DOCUMENTS

| | | | |
|---|---|---|---|
| 6,854,069 B2* | 2/2005 | Kampe et al. | 714/4.12 |
| 7,401,256 B2* | 7/2008 | Ishida | 714/21 |
| 8,589,727 B1* | 11/2013 | Fletcher et al. | 714/13 |
| 2005/0262462 A1 | 11/2005 | Janakiraman | |
| 2008/0010499 A1 | 1/2008 | Vingralek | |
| 2008/0275973 A1* | 11/2008 | Toeroe | 709/223 |
| 2008/0298276 A1 | 12/2008 | Chen et al. | |

(Continued)

OTHER PUBLICATIONS

Salfner et al, A Petri net model for service availability in redundant computing systems; WSC '09 Winter Simulation Conference, pp. 819-826.

(Continued)

*Primary Examiner* — Dieu-Minh Le
(74) *Attorney, Agent, or Firm* — Ericsson Canada Inc.

(57) ABSTRACT

Redundancy models are compared to determine or assist in determining an Availability Management Framework (AMF) configuration of a highly available system based on quantified service availability of the system. Each redundancy model defines assignments of service-instances to service-units. An analysis model of the system is constructed to capture recovery behaviors of the system for each redundancy model. Service availability of the system is quantified based on the analysis model under one or more scenarios including failure scenarios and recovery scenarios. Based on a comparison of service availability levels provided by the redundancy models and subject to constraints of the HA system, one of the redundancy models is identified that provides a required level of service availability for the system.

20 Claims, 9 Drawing Sheets

(56) References Cited

U.S. PATENT DOCUMENTS

| | | | |
|---|---|---|---|
| 2009/0037367 A1* | 2/2009 | Wein | 707/2 |
| 2010/0169446 A1* | 7/2010 | Linden et al. | 709/206 |
| 2011/0035738 A1* | 2/2011 | Toeroe et al. | 717/168 |
| 2011/0197198 A1* | 8/2011 | Kanso et al. | 718/105 |
| 2012/0036496 A1* | 2/2012 | Yang et al. | 717/121 |
| 2012/0240129 A1* | 9/2012 | Kanso et al. | 718/105 |

OTHER PUBLICATIONS

Bassek et al, Redundant Schemes for Highly Availability Computer Clusters; J. of Computer Science 2 (1), 2006, pp. 33-47.

Mills et al, High Availability and Fault Management in Objective Architecture Systems; Milcom 2010, pp. 2399-2404.

Sabbah, Yaniv, International Search Report, European patent Office, Rijswijk, NL, Mar. 26, 2014.

* cited by examiner

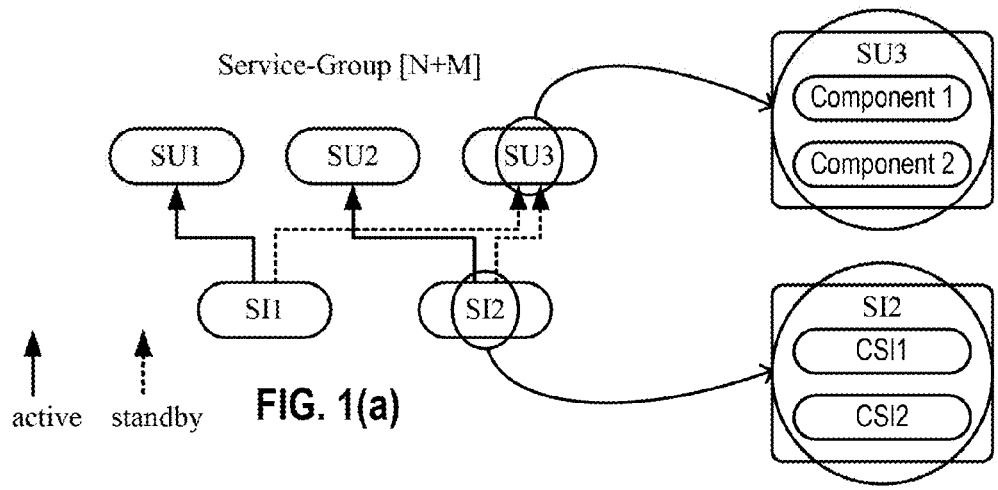
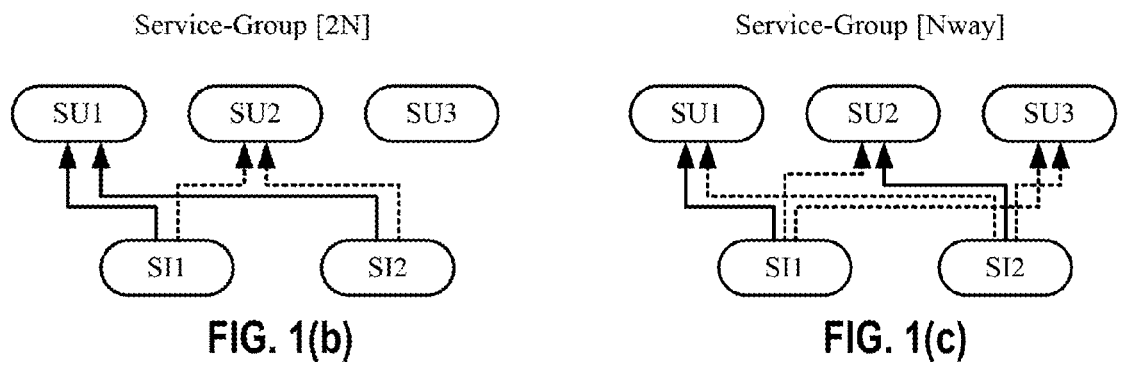
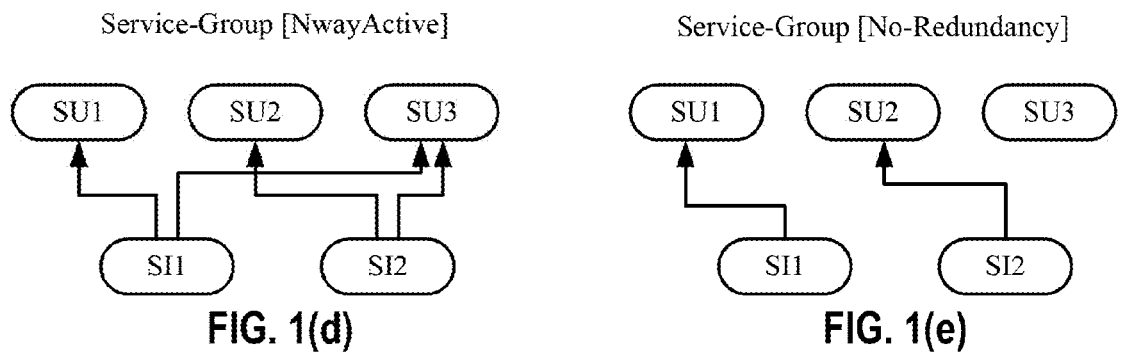
THE REDUNDANCY MODELS IN AMF

THE NODE DSPN MODEL

THE COMPONENT DSPN MODEL

THE SERVICE-UNIT_SERVICE-INSTANCE DSPN MODEL

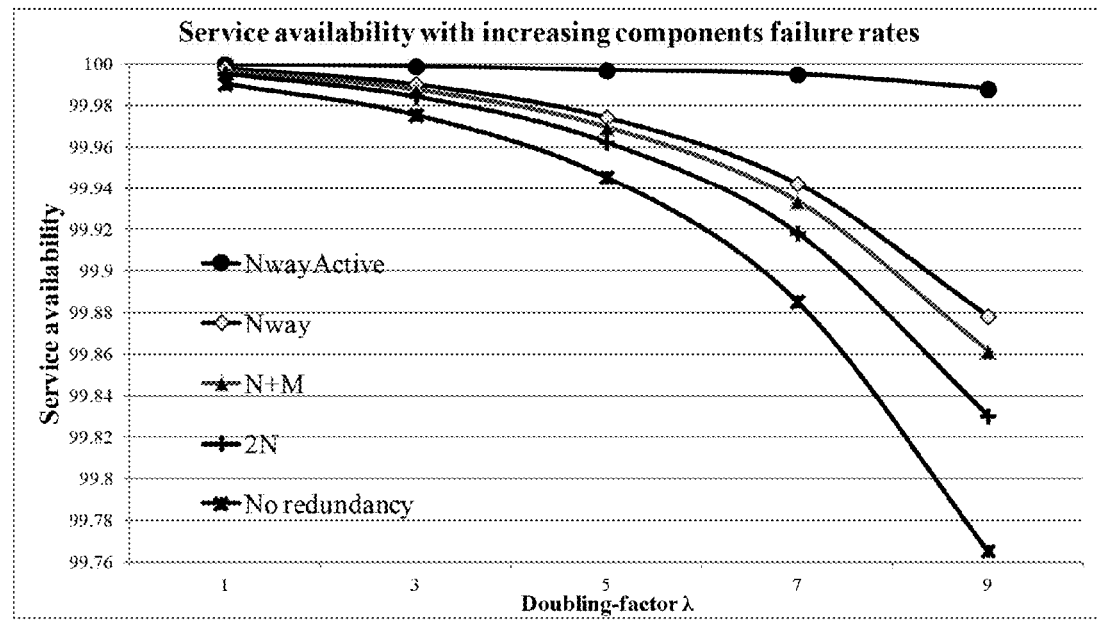
FIG. 5 AVAILABILITY COMPARISON FOR THE REDUNDANCY MODELS
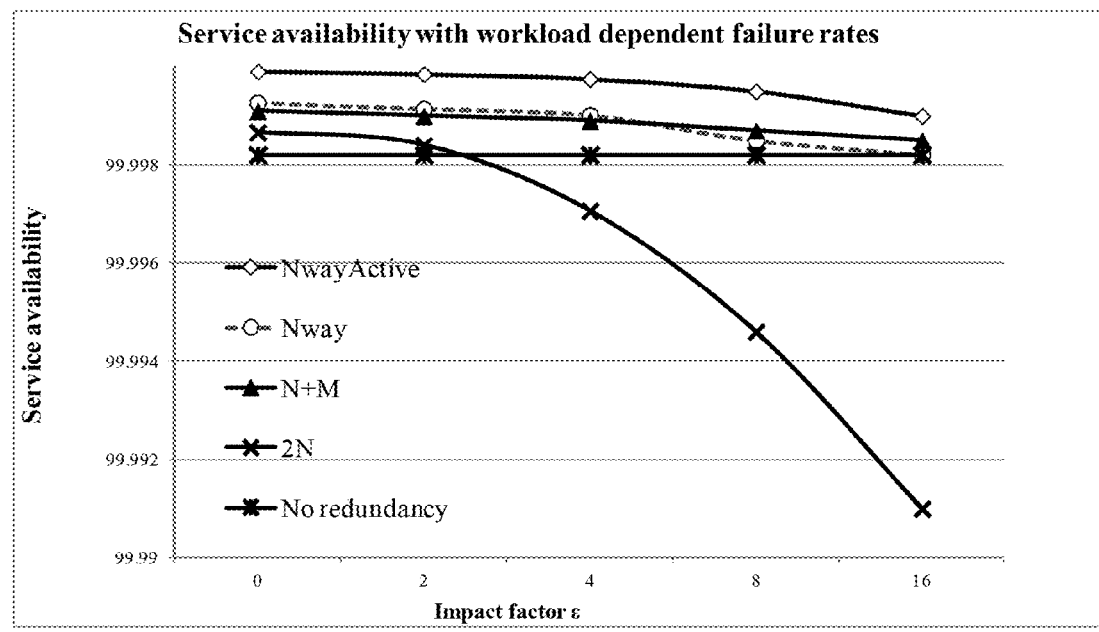
FIG. 8 WORKLOAD IMPACT ON AVAILABILITY

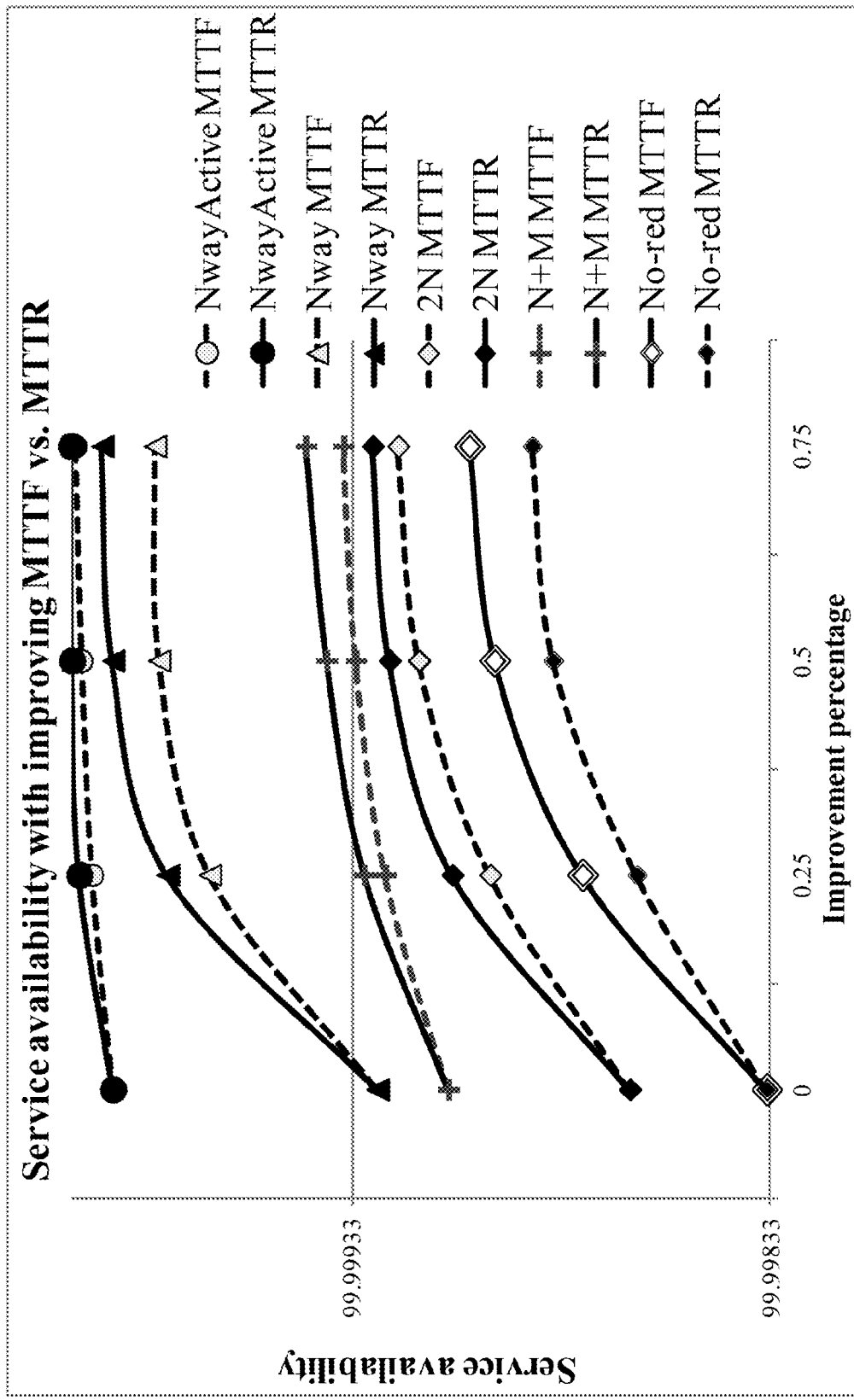
FIG. 7 THE IMPACT OF MTTF AND MTTR ON AVAILABILITY

COMPARING REDUNDANCY MODELS FOR DETERMINATION OF AN AVAILABILITY MANAGEMENT FRAMEWORK (AMF) CONFIGURATION AND RUNTIME ASSIGNMENT OF A HIGH AVAILABILITY SYSTEM

CROSS-REFERENCE TO RELATED APPLICATIONS

This application claims the benefit of U.S. Provisional Application No. 61/683,639, filed on Aug. 15, 2012.

TECHNICAL FIELD

Embodiments of the invention relate to the Availability Management Framework (AMF).

BACKGROUND

Highly available systems are fault tolerant systems capable of delivering the expected services even in the presence of failures. Such systems are built in a modular manner where resources are abstracted into components or modules. Replication of resources is a key ingredient in building highly available systems. This enables failure transparency, whereby the failure of a system component can be masked from the users of the services provided by the system. Replicated (or redundant) resources must be intelligently coordinated to provide the desired end-user experience. This coordination can be achieved through standardized middleware responsible for maintaining the high availability of the services.

The Availability Management Framework (AMF) is considered the main building block of the standardized middleware defined by the Service Availability (SA) Forum (see, *SA Forum, Application Interface Specification, Availability Management Framework SAI-AIS-AMF-B*.04.01). AMF is the middleware service responsible for maintaining service availability; it is primarily responsible for (1) managing the life-cycle of the system components (2) monitor their health, and detecting abnormal behaviors (3) isolate failures, and recover the services (4) attempt to repair the faulty components or nodes. AMF operates according to a system configuration, referred to as an AMF configuration. This configuration serves as a map that guides AMF in maintaining the service availability as well as the desired protection level for these services.

The AMF configuration describes a logical representation of the system resources, as well as the policies to be enforced by AMF to maintain the service availability. The basic building block of the AMF configuration is the component, the component abstracts a set of software and/or hardware resources that can provide a specific functionality and that can be instantiated (or started), and terminated (or stopped) by AMF (e.g. a component can abstract a software process). The workload to be assigned by AMF to the components is abstracted by the component-service-instance. This workload, when assigned, will trigger the components to start providing a specific functionality. A component may be assigned multiple component-service-instances; e.g., a component may implement multiple interfaces with different functionalities. The components that collaborate to provide a more integrated service are grouped into a service-unit. The workload assigned to the service unit is abstracted into a service-instance, which aggregates a set of component-service-instances. The service-unit is considered the unit of replication; i.e., redundant service units, typically deployed on different nodes, compose a service-group. The service-instances are protected against failures within the context of the service-group. The service group is characterized by a redundancy model. AMF defines five different redundancy models. At runtime AMF assigns the service-unit the HA (High Availability) states (active/standby) on behalf of the service-instances.

The service availability depends to a large extent on the redundancy model (or replication style) according to which the service is being protected against failures. The redundancy model defines the role (active, standby, spare or cold standby etc.) that a component assumes in providing and protecting the service availability. Due to the redundancy, the availability of the services is no longer correlated with the system component currently providing the service. This is because even with the failure of this component, another replica can resume the service provision. Therefore, logically the service can be decoupled from the component(s) providing the service.

There are several existing methods targeting the availability analysis, some are oriented towards the system availability, while others focus more on the service availability. For example, in Salfner, et at., "*A Petri net model for service availability in redundant computing systems*," Proc. of the 2009 Winter Simulation Conference, pp. 819-826, 13-16 Dec. 2009, the authors analyze the effect of adding more standby servers to the system on service availability. In Wang, et al., "*Modeling User-Perceived Service Availability*" in ISAS 2005. LNCS, vol. 3694, pp. 107-122. Springer 2005, the authors analyze the availability of an AMF configuration with a redundancy model of 2N. Nevertheless, none of these methods analyze and compare the service availability in the context of the multiple redundancy models defined by the SA Forum.

SUMMARY

A computer-implemented method and a computer system are described for comparing a set of redundancy models to thereby determine or assist in determining an Availability Management Framework (AMF) configuration of a highly available (HA) system based on quantified service availability of the HA system. Each redundancy model defines assignments of a plurality of service-instances representing workload to a plurality of service-units representing resources. Each service-unit represents a unit of replication in the redundancy models.

According to one embodiment of the invention, the method constructs an analysis model of the HA system to capture recovery behaviors of the HA system for each of redundancy models, and quantifies the service availability of the HA system based on the analysis model under one or more of a plurality of scenarios including failure scenarios and recovery scenarios. The method further compares levels of the service availability provided by the redundancy models; and identifies, based on the compared levels of the service availability and subject to constraints of the HA system, one of the redundancy models that provides a required level of service availability for the HA system.

According to another embodiment of the invention, the computer system comprises a processor and a memory, the memory containing instructions executable by the processor. The computer system is operative to construct an analysis model of the HA system to capture recovery behaviors of the HA system for each of redundancy models; quantify the service availability of the HA system based on the analysis model under one or more of a plurality of scenarios including failure scenarios and recovery scenarios; compare levels of the service availability provided by the redundancy models; and identify, based on the compared levels of the service availability and subject to constraints of the HA system, one of the redundancy models that provides a required level of service availability for the HA system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1(a), FIG. 1(b), FIG. 1(c), FIG. 1(d) and FIG. 1(e) illustrate examples of redundancy models defined by AMF according to one embodiment of the invention.

FIG. 5 illustrates availability comparison for the redundancy models according to one embodiment of the invention.

FIG. 7 illustrates the impact of failure and recovery characteristics on different redundancy models according to one embodiment of the invention.

FIG. 8 illustrates the workload impact on availability for different redundancy models according to one embodiment of the invention.

DETAILED DESCRIPTION

Figure 2:
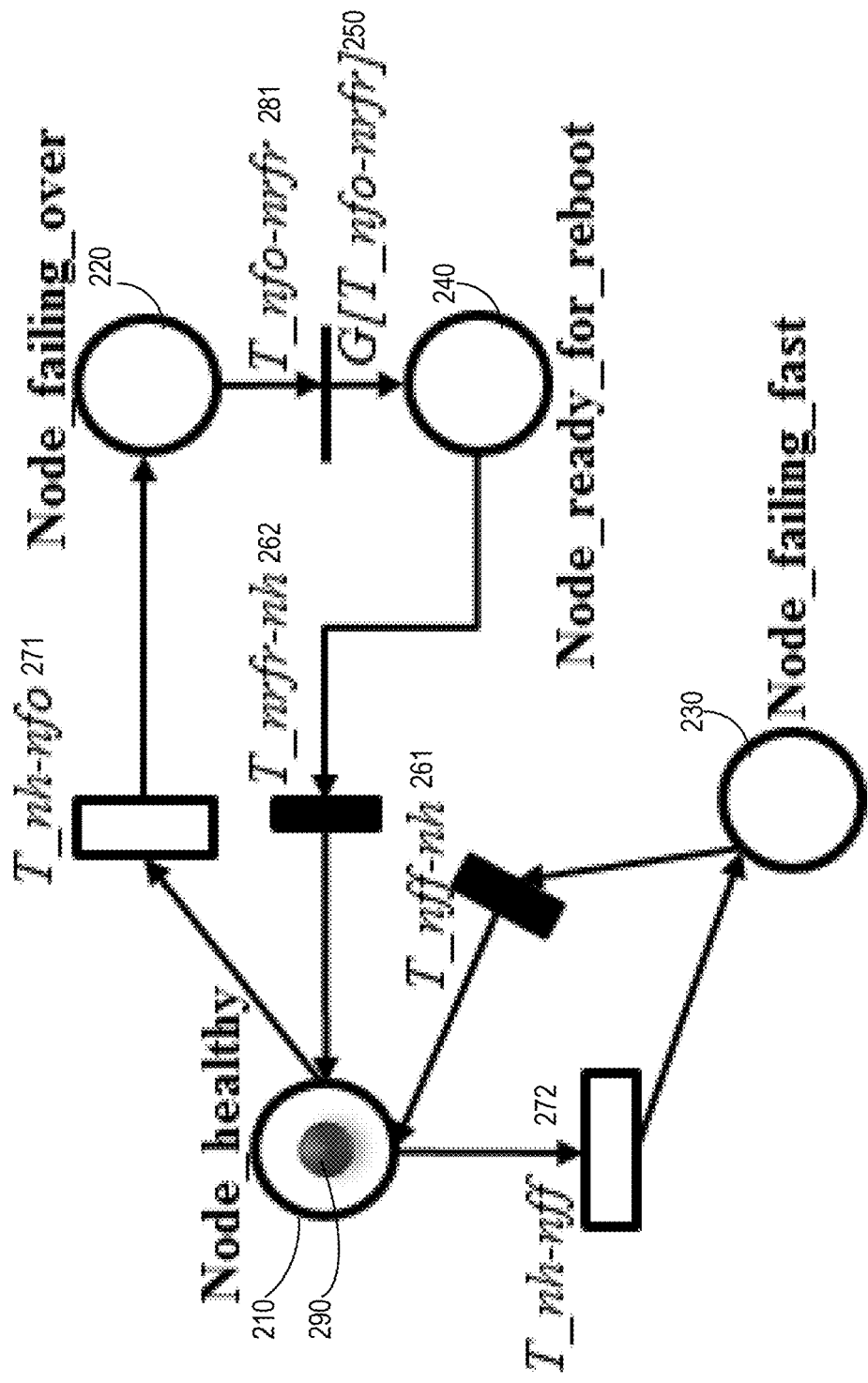
FIG. 2 illustrates an example of an analysis model for a node according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a method and system that analyzes the service availability in the context of the various redundancy models defined by the SA forum, compares the effectiveness of the redundancy models with regard to different criteria, and presents configuration recommendations according to the analysis and comparison.

There are many definitions for service availability depending on the type of service, and the perspective from which this availability is analyzed. For instance the user-perceived service availability may differ from the actual service availability as it also depends on the user behavior. In the following analysis, a service is said to be available as long as it is assigned to a healthy component in the system capable of providing it, regardless of any user experience.

An AMF Configuration Example. In an example to be described herein, a Video Local Area Network (LAN) Client (also referred to as "VLC") media streaming application is integrated with an open source implementation of the SA Forum middleware. The media streaming application is dimensioned into two components: (1) the VLC component as a streaming server, and (2) an IP component that is defined to emulate a virtual IP solution, where the receiver of the stream is not impacted when the physical (or virtual) machine fails, and the streaming server is failed over to another machine.

The active VLC component is responsible streaming the requested media. In the redundancy models where the standby is needed, the active component is periodically check-pointing the current position of the stream and the stream destination address. The standby VLC, loads the media upon instantiation and waits to be given the active assignment by AMF (as part of a failover procedure), it will start streaming the media from the check-pointed position, thus enabling service continuity. The IP component is responsible for making sure that at any given point only one node has the streaming IP address (i.e., the IP address of the node from which the stream is being sent to the user). This component will execute an IP takeover when the component with the streaming IP address fails, and it will give this address to another node. In case of the redundancy models with active-active is needed, it is assumed that both of the VLC components will be streaming (in a synchronized Master-Slave manner), but only one will have the streaming IP address. Hence in case of failure, the outage is simply the time needed to perform an IP takeover on the slave node.

For the AMF configuration, the VLC component and the IP component are grouped into one service-unit, and the service-instance is defined to abstract the media streaming workload. This service instance is composed of two component-service-instances, abstracting the workload of VLC, and the IP component. The VLC component-service-unit describes the various streaming parameters such as the stream protocol, the streaming mode, etc. The Component-service-instance of the IP component simply specifies the current source IP address (for the stream) that must be assigned to the redundant node in case of failover. The service-group would be a grouping of several media streaming service-units that can collaborate to protect the media streaming workload according to a specified redundancy model.

Redundancy Models.

The redundancy models differ in the number of active and standby assignments each service-instance may have and the distribution of these assignments among the service-units. The five redundancy models can be summarized as follows:

A service-group with the N+M redundancy model has N active service-units (SUs) and M standby service units. A service-unit can be either active or standby for all service-instances (SIs) assigned to it. That is to say, no service-unit can be simultaneously active for some service-instances and standby for some other service-instances. A service-instance can be assigned to at most one service-unit in the HA (High Availability) active state and to at most one service-unit in the HA standby state. FIG. 1(a) shows an example of a service-group in 2+1 redundancy, where three service-units (SU1, SU2 and SU3) in the service-group service two service-instances (SI1 and SI2). In FIGS. 1(a)-1(e), the solid lines between service-units and service-instances represent active assignments, and the dotted lines between service-units and service-instances represent standby assignments. Each service-unit is composed of two components and each service-instance is composed of two component-service-instances.

The 2N redundancy model is a special case of the N+M, where at most one service-unit will have the active HA state for all service-instances protected by this service-group and it is referred to as the active service-unit, and at most one service-unit will have the standby HA state for all service-instances and it is called the standby service-unit. FIG. 1(b) shows an example of a service-group with the 2N redundancy.

A service-group with the Nway redundancy model contains N service-units that protect multiple service-instances. A service-unit can simultaneously be assigned the active HA state for some service-instances and the standby HA state for some other service-instances. At most, one service-unit may have the active HA state for a service-instance, but one, or multiple service-units may have the standby HA state for the same service-instance, as shown in the example of FIG. 1(c).

A service-group with the NwayActive redundancy model contains N service-units (shown in the example of FIG. 1(d)). A service-unit has to be active for all service-instances assigned to it. A service-unit is never assigned the standby HA state for any service-instance. From the service side, for each service-instance, one, or multiple service-units can be assigned the active HA state according to the preferred number of assignments, configured for the service-instance. This number should always be less or equal to the number of service-units in the service-group.

In the No-Redundancy redundancy model (shown in the example of FIG. 1(e)) there are no standby service-units, but there can be spare service-units, i.e., service-units that are available for assignment. A service-instance can be assigned to only one service-unit at a time. A service-unit is assigned the active HA state for at most one service-instance.

All the information related to the availability management is specified in the configuration, e.g., the redundancy model, the number of active/standby/spare service-units per service-group as well as the number of active/standby assignments per service-instance.

Recovery Management.

The recovery management takes place within the boundaries of the service group. In case of a component failure, if the failure is detected by AMF, then AMF would either execute the default recovery specified in the configuration on behalf of the component, or, if the error was detected by another component or monitoring facility and then reported to AMF, then AMF applies the recommended recovery specified in the report. A recovery is typically either a restart or a failover. Such recovery can be executed at various scopes ranging from the component, which is the lowest level of granularity for the recovery, to the service-unit, to the node and all the way to the application which can only be restarted.

Certain redundancy models constrain the recovery at the component level. For instance in Nway or NwayActive, when one component of the service-unit fails and the recovery is a failover, then the service-instances being served by this component will failover to other component in different service-units of the service-group. Nevertheless, the other service-instances served by the rest of the (sibling) healthy components can keep their assignment with this service-unit (unless AMF fails to repair the faulty component in which case the service-unit will be disabled and all the service-instance assigned to the service-unit have to failover). In 2N and N+M this is not allowed, as it violates the (configured) number of active of service-unit in the service-group, and therefore when a component fails, its entire service-unit has to switchover (a switchover is a more graceful way of failing over).

NwayActive redundancy can be used in different modes according to the logic of the software application that is being managed. The first mode is workload sharing, where for example incoming user requests are distributed among multiple active service-units. This is the typical case with multiple web servers that implement a virtual IP solution that allows them to collaborate to serve the requests in an Nway-Active manner. In this mode, there is no service continuity in case of failure, as the user requests are not backed up. The second mode is workload duplication, where multiple servers would be serving the same workload; however, only the so-called master server will return the results to the user. In case the master fails, the slave(s) can transparently take over. This mode is resource intensive because of the active redundant components. The latter mode is considered in the case study to be described.

Availability Analysis Modeling

The availability of the services can be quantified by examining the system states, and measuring the percentage of time the service is provided. In one embodiment, the system behavior is modeled in terms of states and the transitions among these various states. In the system, transitions can take place in a stochastic manner, e.g., the occurrence of a failure, or in a deterministic manner, e.g., the restart of a component, which has a known or at least bounded duration. Therefore, in one embodiment, the Deterministic and Stochastic Petri Nets (DSPNs) is chosen to model our system's behavior. DSPNs are an extension of Petri Nets that support the transitions in the system. DSPNs are composed of places, tokens, arcs, guards and transitions. A place (denoted by a hollowed circle) abstracts a certain state. A token (denoted by a filled circle) resides in a place, and signifies that the system is in the state represented by the place hosting the token. Tokens can leave a state through transitions connected to the place by an arc (denoted by an arrow), when the transition fires. Stochastic transitions are denoted by a hollowed rectangle. A stochastic transition is characterized by a probability distribution function (e.g., the exponential distribution) according to which it fires. Deterministic transitions can be timed or immediate: timed transitions are denoted by filled rectangles and are characterized by constant delays. Immediate transitions are denoted by a line (or a thin filled rectangle). Transitions in general and especially immediate ones can be guarded by an enabling function (which is a Boolean expression referred to as the guard). A transition is only enabled when its guard evaluates to true. When a transition fires it transports one or many tokens from the source place(s) to the destination place(s) connected by arcs. Under certain conditions, DSPNs can be solved analytically by transforming them into a Markov Regenerative Process.

Modeling the complete runtime behavior of AMF is outside of the scope of this description. Embodiments described herein model the main states that the AMF managed system goes through at runtime. Accordingly, in one embodiment, three generic DSPN models are defined to model (1) the components, (2) the service-instances and their association to the service-units, and (3) the nodes. The guards' annotation will serve two purposes. The first is connecting the DSPN models; i.e., the guards will reflect the impact of the changes of one model on another. The second is customizing these models to the relevant entities being modeled. In the following, an overview of these DSPN models is presented without going exhaustively into the details.

The Node DSPN Model.

FIG. 2 illustrates an embodiment of a node DSPN model. In this embodiment, three states for a node are defined. A node In the DSPN description, the terms 'place' and 'state' are used interchangeably. Initially, the node is assumed to start in the healthy state (Node_healthy 210). From this state, the node can either go to a failing-over (Node_failing_over 220), or a failing-fast (Node_failing_fast 230) recovering state. The rate of the transitions to these states depends on the Mean Time To Failure (MTTF) associated with each of these recoveries. Each of these states captures a different type of recovery: The failing-fast state 230 signifies that the failure manifesting in the node should be isolated as fast as possible, and therefore the node is abruptly rebooted. On the other hand, the node can go into a failing-over state 220 when the failure is less critical and the node is still responsive; e.g., the node could be losing memory due to a memory leak, or the CPU temperature is rising above normal. In this case the components on the node are terminated, after which, the node is ready to be rebooted. The transition to the Node_ready_for_reboot 240 state is guarded by G[T_nfo-nrfr] 250, which evaluates to true when all the nodes components are in the Comp_un-instantiated state (shown in FIG. 3). The embodiment of FIG. 2 also shows examples of stochastic transitions (hollowed rectangles 271, 272), deterministic transitions (filled rectangles 261, 262) and an immediate transitions (line 281). A token 290 is shown to be within the Node_healthy state 210.

The Component DSPN Model.

Figure 3:
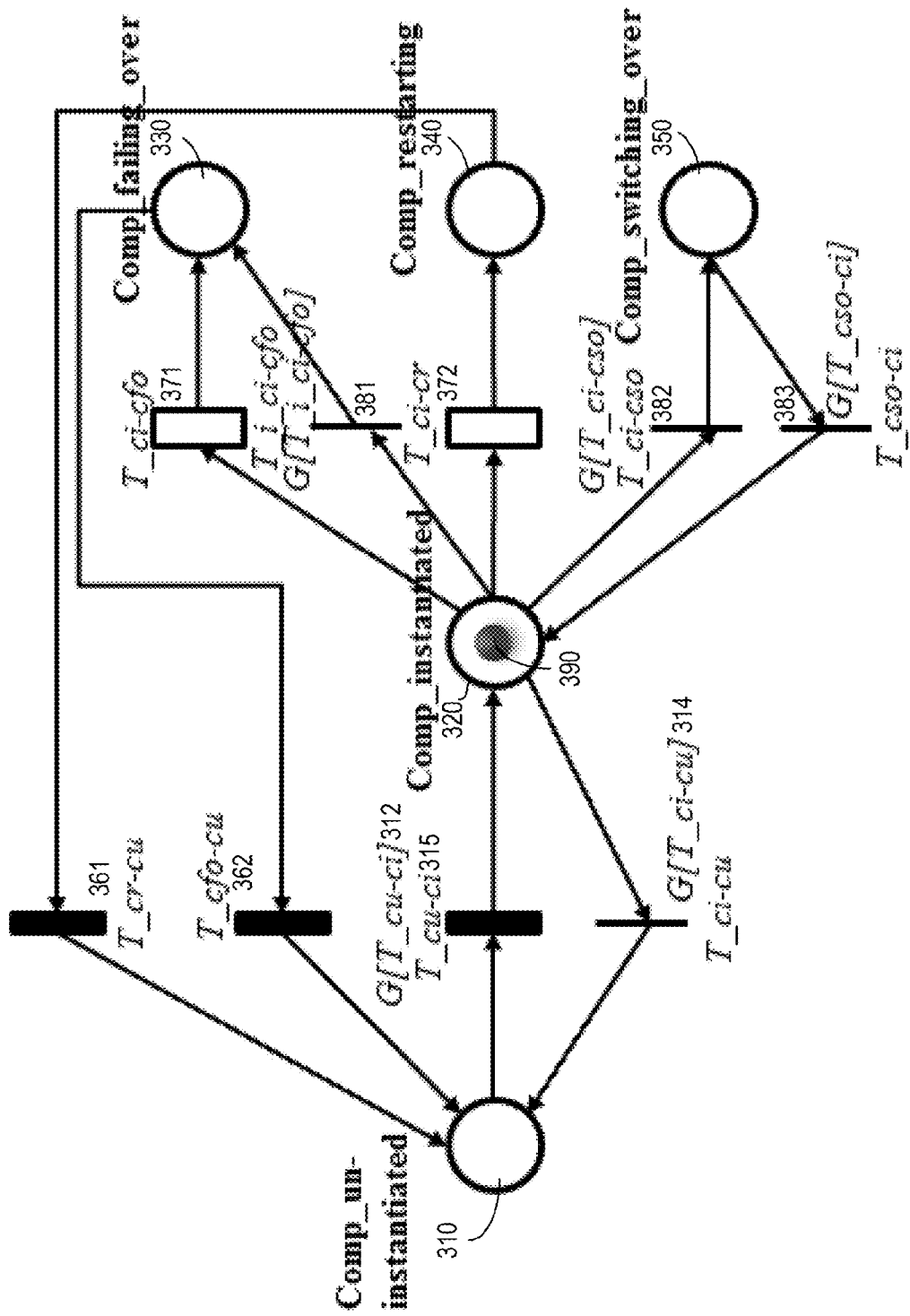
FIG. 3 illustrates an example of an analysis model for a component according to one embodiment of the invention.

FIG. 3 illustrates an embodiment of a component DSPN model. In this embodiment, the component DSPN model describes the various states of a component. A component is initially in the un-instantiated (Comp_un-instantiated 310) state. It can move to the instantiated (Comp_instantiated 320) state through a deterministic transition 315, because the time needed to instantiate a given component can be measured and bounded. The dependency between the node and the components it hosts is captured by various guards. The G[T_cu_ci] 312 guard evaluates to true when the parent node is healthy, otherwise a component cannot be instantiated (i.e., the token 390 will not be allowed to transition from the (Comp_un-instantiated 310 to the Comp_instantiated place 320). In case of node failfast, the node is abruptly shut down causing a component running on this node to become immediately un-instantiated. This is captured by the guard G[T_ci-cu] 314. An instantiated component can go immediately into a failing-over state 330 (e.g., through the immediate transition 381) if the parent node is failing-over, but it can also go to a failing-over (Comp_failing_over 330) or a restarting (Comp_restarting 340) state in a stochastic manner (e.g., through the stochastic transition 371 or 372). The rate of the latter transitions depends on the Mean Time To Failure (MTTF) associated with each of these recoveries. A faulty component is first cleaned-up (abruptly terminated) by AMF. This is captured by transitions T_cr-cu 361 and T_cfo-cu 362. The delay parameter of these transitions is equal to the time needed to perform the clean-up. Finally, depending on the redundancy model, a component can go immediately into a switching over (Comp_switching_over 350) state through immediate transition 382 or 383 when a sibling component is failing over, and the redundancy model is 2N, N+M, or No-Redundancy, because these redundancy models do not allow a partial failover of the service-unit.

The Service-Unit_Service-Instance DSPN Model.

Figure 4:
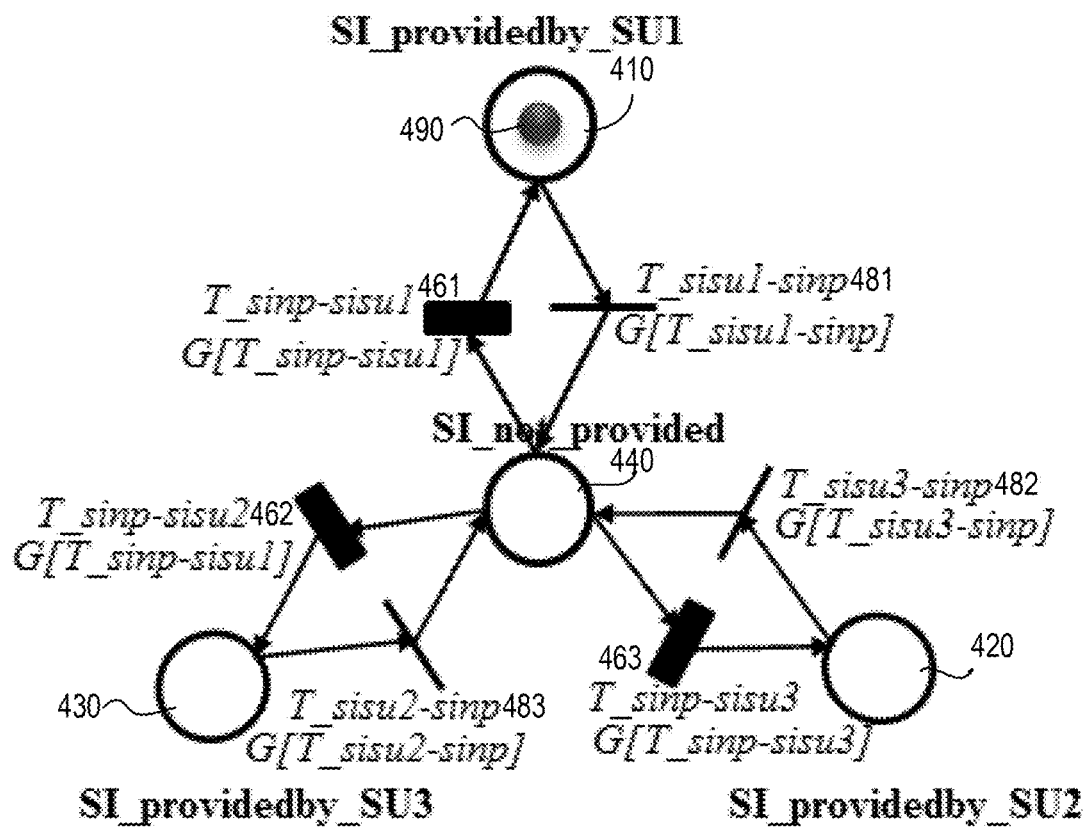
FIG. 4 illustrates an example of an analysis model for a service-unit according to one embodiment of the invention.

FIG. 4 illustrates an embodiment of a service-unit_service-instance DSPN model. This model is defined for at least two purposes: (1) to determine when a service-instance is provided, and when it is dropped, and (2) to capture the runtime active assignment of the service-unit on behalf of the service-instance. In the embodiment shown in FIG. 4, there is a place for each service-unit that can provide the service instance (e.g., 410, 420 and 430). Except for the case of NwayActive, the service-instance is either provided by one service-unit at any given point in time or not provided, i.e., going through a recovery. The service availability can then be quantified by the probability of not having the service in the SI_not_provided place 440 at steady state (i.e., when time reaches towards infinity).

To capture the differences between the redundancy models, the guards and the transition rates of this model can be used. All the transitions (e.g., 481, 482 and 483) to the SI_not_ provided place 440 are immediate and they are triggered by the failure of any of the components serving the service-instance; e.g., if service-instance A represented by the token is served by components B and C of a given service-unit represented by the place SI_providedby_SU1 410, then if any of these components leave the Comp_healthy state the guard G[T_sisu1_sinp] evaluates to true and the token 490 representing service-instance A will immediately transition into the SI_not_provided state 440. At this point the service-instance can switch to another service-unit, once all components previously serving it are cleaned up (except in the case of a switchover). The time needed for this switch is captured in the deterministic transitions (e.g., 461, 462 and 463) of FIG. 4. The delay of these transitions varies depending on the redundancy model and the current marking of the DSPNs. This delay can assume three different values, to reflect the time needed (1) for transitioning an active "slave" component to become a "master," and (2) to transition from the standby assignment to the active assignment, which is shorter than (3) transitioning the service-instance from being unassigned (i.e., spare) to becoming actively assigned; e.g., in No-Redundancy the transitions always follow the longer delay since there is no standby assignment. In other cases this longer delay is only used when failures occur back to back and the standby (or the second active in case of NwayActive redundancy) assignment is lost. To express this preference, marking-dependent transition delays may be used in some embodiments. This is a feature of DSPNs that allows the delay associated with a transition to a function of the current marking of the net.

The guards play an important role in reflecting the specifics of the redundancy model for example in the No-Redundancy. For example, when a given service-instance A is provided by a service-unit, then all the transitions that allow other service-instances to be provided by the same service-unit are disabled, since the redundancy model allows a maximum of one service-instance per service-unit.

Availability Analysis.

To analyze the service availability provided by the different redundancy models, different DSPNs are created according to the examples shown in FIGS. 1(a)-1(e) according to one embodiment of the invention. In order to analyze the availability, in one embodiment, different DSPNs are created where each DSPN is composed of several instances of the models presented herein.

In the following example of redundancy models comparison, for each redundancy model shown in FIGS. 1(a)-1(e), six instances of the component DSPN model, three instances of the node DSPN model and two instances of the service-unit_service-instance DSPN model are created. In this example, the DSPNs are structurally identical, and they differ only in the guards and the transition delays, which are associated with the respective redundancy models. It is appreciated that the following testing, comparisons and analysis are exemplary in nature, and that other comparison methodologies may be used.

Comparison of the Redundancy Models

Using the DSPN analysis model described above, the different redundancy models are compared under various conditions. One objective is to compare the different availability levels that the redundancy models are expected to offer under varying failure and recovery rates. The parameters shown in Table 1 and 2 are based on the testing performed on the aforementioned VLC example (also referred to as the "test application"). As mentioned above, for the purpose of this example testing, each service-unit has two components: the VLC component and the IP assignment component.

The recovery time depends on the recovery itself, e.g., in a component restart, the recovery time is clean-up time+instantiation time+assignment time, while (with the test application) the failover time is shorter (cleanup+assignment time). Therefore, the component failover is specified to be a default component recovery in this example testing. In the analysis it is assumed that the component restart recovery is only used in case the redundancy is lost due to multiple failures. It should be noted that the failover is not necessarily always faster than a restart, especially in the cases where a failover involves moving large amount of data across the network from one node to another.

TABLE 1

Parameter values

| Parameter | Value |
| --- | --- |
| Node reboot time | 45 sec |
| VLC component cleanup time | 0.027 sec |
| VLC component instantiation time | 0.542 sec |
| VLC un-assigned→active assignment time | 0.080 sec |
| VLC standby → active assignment time | 0.030 sec |
| IP takeover time | 0.005 sec |
| MTTF with a node failover recovery | 72 hours |
| MTTF with a node failfast recovery | 96 hours |
| MTTF for a VLC component with a failover recovery | 24 hours |

In this example testing, resource consumption is per assignment, where the assignment consists of loading the media in case of standby without streaming, while in the active case the media would also be streamed using the RTP protocol. With the standby mode, the CPU is almost idle, compared to the active assignment CPU consumption as shown in Table 2.

TABLE 2

The resource consumption per assignment

| State | CPU | Memory |
| --- | --- | --- |
| Active | 849 MIPS | 28836 KB |
| Standby | 0.0001 MIPS | 16788 KB |

With the default parameters shown in Table 2, the redundancy models of FIGS. 1(a)-1(e) are compared with the following assumptions:

The spare service-unit in No-Redundancy and 2N is instantiated.

The service-units are capable of providing any service-instances.

The service-instances impose identical workload on the components and the nodes, i.e., the active assignment implies streaming the same media type/size.

Any service-unit (through its components) has the capacity of serving two service-instances.

The middleware failure and the operating system failure are included in the node failures.

To simplify the DSPN models, it is assumed that the failure detection and AMF reaction delays are included in the time needed for the transition from the not provided to the provided state; i.e., they are considered after the recovery action is initiated.

It should be noted that the above assumptions are only for illustrative purposes; different assumptions may be used and may generate different testing results. Thus, it should be noted here that the conclusions drawn from the experiments/testing below are based on a case study, and may apply only to similar applications that consume similar resources and exhibit similar failure and recovery rates. Nevertheless, the modeling and analysis methodologies described herein have general applicability. Throughout the experiments a sensitivity analysis is performed that provides a comprehensive understanding of the impact of various factors.

Availability Comparison of the Redundancy Models.

In the following analysis, the DSPN models are solved initially with the parameters defined in Table 1. A measure of interest is the average availability of both service-instances. To that end, a sensitivity analysis is performed by varying the component failure rate (e.g., by multiplying the rate by $2^{\lambda-1}$, where $\lambda$ is a doubling-factor ranging from 1 to 9). FIG. 5 illustrates an example of the experimental results. The results show that NwayActive offers the highest availability level reaching 99.99992% while No-Redundancy performs relatively poorly with 99.99834%. With the given failure rate, all of the redundancy models (except No-Redundancy) achieve the high availability defined by five nines (99.999%). High availability was achieved because of the fast recovery, even though the components are not reliable and fail on a daily basis and the nodes (including the OS and middleware) fail roughly every 41 hours causing either a failover or a failfast. It is also noticed that when the failure rate increases the availability offered by redundancy model such as No-Redundancy (where the recovery takes longer) drops much faster than others such as NwayActive.

Figure 6A:
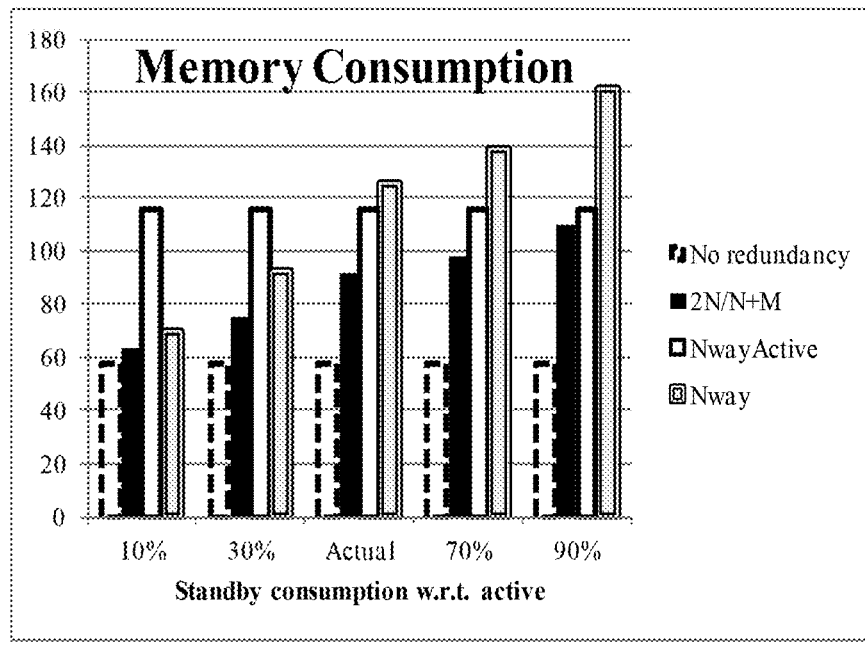
FIGS. 6(a) and 6(b) illustrates the total memory and CPU consumption in each redundancy model according to one embodiment of the invention.
Figure 6B:
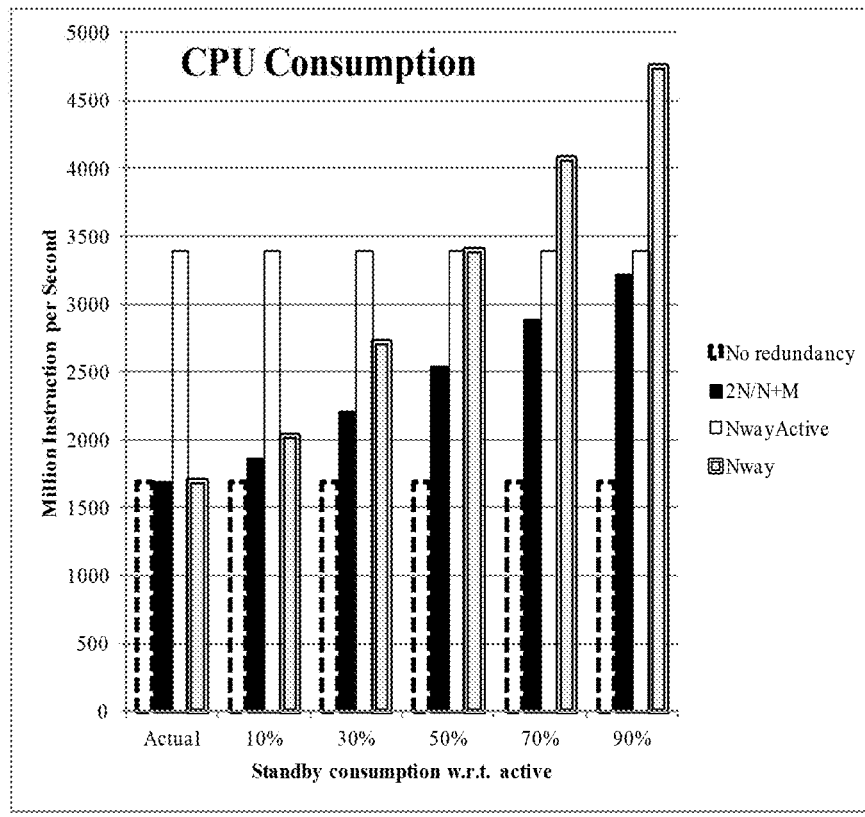

The different redundancy models provide different levels of availability; however they also consume different resources. FIG. 6(a) and FIG. 6(b) illustrate examples of the total memory and CPU consumption in each redundancy model (based on the AMF configurations of FIGS. 1(a)-1(e), and Table 2). The memory consumption is measured in Kilobytes while the CPU consumption is measured in Million Instruction Per Second (MIPS). In the test application the standby memory consumption is roughly half of the active, however, the CPU consumption is almost negligible compared to the active. In FIG. 6(a) and FIG. 6(b), it is shown that not only the actual consumptions in the case study but also in other cases where the standby consumption is varied with respect to the active from 10% to 90%. This variation is done to show the consumptions rate per redundancy model, when the application consumes different resources than the one which is experimented with, e.g., it can be seen clearly that NwayActive does not necessarily always consumes more resources than Nway according to the results of this example. It is understood that the memory and CPU consumptions shown in FIGS. 6(*a*) and 6(*b*) are illustrative only and they may be different when different parameters, assumptions and test application are used.

In the context of the case study, NwayActive redundancy model outperformed the others and therefore would be a preferred configuration choice to achieve higher availability with the same components. However, the choice of the redundancy model is constrained by other factors such as the application logic and whether it is implemented to support multiple active or the standby assignments, as well as the available resources for the application; e.g., CPU and memory. In other words, the system integrator might have to trade-off availability for resource consumption in case the resources are scarce.

Comparing MTTF with MTTR.

The question of which measure is more important for high availability between the failure rate and the recovery rate has long been debated as it depends on the specifics of the system being analyzed. It is the issue of which is more important, the system reliability or its recovery, i.e., how long it takes for the system to fail, versus how fast the services are recovered in case of failure. In the following experiment the service availability while improving the failure rates, i.e., increasing the MTTF, is contrasted with improving the recovery rate by making the service recovery time (Mean Time To Recover, MTTR) shorter. FIG. 7 illustrates an example of the experiment results according to one embodiment. The results of FIG. 7 show that (in the specific context of the case study) improving MTTR has a greater impact on availability in all the redundancy models, except No-Redundancy. In No-Redundancy the MTTF is more significant for the availability. This can be attributed to the fact that in No-Redundancy, when a second failure occurs while the repair of the first failure is still in progress, one service-instance is dropped (since this redundancy model allows for a maximum of one service-instance per service-unit) until the completion of the repair and a second service-unit becomes ready. Thus by improving the MTTF, the probability of having two failures simultaneously in the system is reduced.

Although both MTTF and MTTR affect the service availability, improving them is not necessarily achieved through the same measures. For instance from the hardware perspective, MTTF improves by acquiring more reliable hardware, while the MTTR improves by increasing the hardware speed and capacity. From a software perspective, MTTF improvement involves reducing the software faults and complexity while improving the MTTR means better failure detection techniques and reducing the reaction time to the detected failures. For both hardware and software MTTR may be improved by configuring more frequent monitoring.

The Impact of the Workload on Availability.

In the experiments shown thus far, the failure rates have not been correlated with the workload, i.e., the effect of the workload on the frequency of failure has not been considered. In addition, the redundancy models cope with failures by re-distributing the workload of the failed entity among the remaining ones increasing their load, and they do so differently. The numbers shown in Table 1 are based on a context where a service-unit's load is equivalent to a single active assignment (we consider this as the reference load). Accordingly, any setting in which the service-unit assignments exceed this reference load would increase the failure rate F. This increase is a function of an impact factor ϵ as shown in Equation 1. It is assumed that the active assignment represents one unit of the reference workload, while the standby represents 0.1. In other words, this experiment was performed under the assumption that the standby load is 10% of the active one; e.g., if a service-unit is assigned one active and one standby service-instance, then the $current_{load}$ would be 1.1 (1+0.1) compared to the $reference_{load}$ which is 1. For the initial failure rate $F_{initial}$, it is calculated based on the assumption that the $current_{load}$ is equal to the $reference_{load}$.

$$F = F_{initial} \times \left\{ 1 + \varepsilon \times \left( \frac{current_{load} - reference_{load}}{reference_{load}} \right) \right\} \quad (1)$$

The impact of increasing the workload above the reference load can be captured by using the factor ϵ. When this factor has a value of zero, this means that the failure rate is irrespective of the workload, however, if for example ϵ is assigned a value of sixteen, a service-unit with two active assignments (i.e., double the reference load) causes the failure to increase by sixteen times.

In the experiment results shown in FIG. 8, the impact factor ϵ is varied between zero and sixteen. The availability levels offered by different redundancy models are no longer absolute levels, but rather they now depend on (1) by how much we are exceeding the reference load and (2) what is the impact of exceeding this load. In the experiment, the most negatively impacted redundancy model is the 2N, since the active assignments are always provided by the same service-units, and the recovery time is rather large compared to the NwayActive redundancy, which also performs poorly in this experiment. In fact with the increase of the impact factor, NwayActive would become a bad choice of redundancy as it consumes more resources than other redundancy models that can deliver better availability in this context. The experiment also shows that it is not necessarily true that adding more standbys—as it was done to the Nway redundancy model—has always a positive impact on the availability. In fact the N+M redundancy model with a single standby assignment performs better under certain circumstances. That is, when N+M creates less load the per service unit than Nway it may become the redundancy model of choice (again if standby is required). Note that in No-Redundancy the workload is always limited to a maximum of one active assignment (which is equal to our reference load) and hence it is not affected in this analysis. As mentioned above, it is understood that the results of the experiments are illustrative only and they may be different when different parameters, assumptions and test application are used.

The above description presents five redundancy models supported by the AMF specifications. An analysis model is defined that captures the recovery behavior of the middleware for the different the redundancy models. The analysis model is used to quantify the service availability with varying failure and recovery rates. Based on the results, the redundancy models may be ranked, noting that this ranking depends on certain circumstances. This lead to an assignment distribution recommendation toward implementers of AMF as well as some configuration considerations. The results show that the recovery is not necessarily always more significant than the reliability. When correlating the reliability with the workload imposed on the system, it is shown that the effect of excess workload can change the rankings of the redundancy models in terms of the availability they offer. The availability analysis may be used to identify configuration patterns that can be used in the design of the system configuration to maximize the service availability. The results of analyzing failure, recovery and workload scenarios may be used to recommend preferred scenarios for a given redundancy model for system runtime operations.

Figure 9:
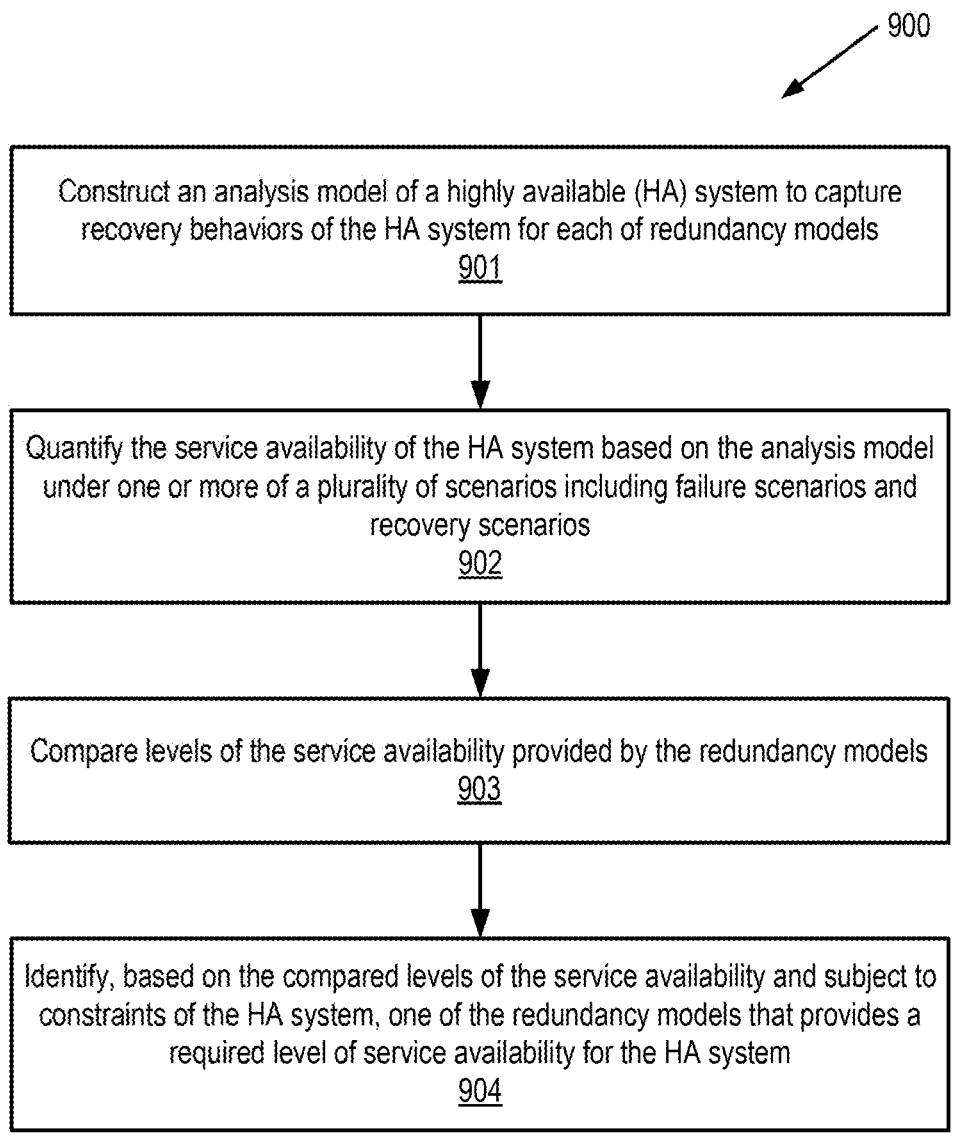
FIG. 9 is a flow diagram illustrating a method performed in accordance with one embodiment of the invention.

FIG. 9 is a flow diagram illustrating a method 900 for comparing a set of redundancy models to thereby determine or assist in determining an AMF configuration of a highly available (HA) system based on quantified service availability of the system, wherein each redundancy model defines assignments of a plurality of service-instances representing workload to a plurality of service-units representing resources, and wherein each service-unit represents a unit of replication in the redundancy models and includes one or more components that can be instantiated at runtime to provide functionalities of the HA system. Referring to FIG. 9, in one embodiment, the method 900 begins with a computer system constructing an analysis model of the HA system to capture recovery behaviors of the HA system for each of redundancy models (block 901). The computer system then quantifies the service availability of the HA system based on the analysis model under one or more of a plurality of scenarios including failure scenarios and recovery scenarios (block 902). The computer system compares levels of the service availability provided by the redundancy models (block 903). Based on the compared levels of the service availability, the computer system identifies a redundancy model that provides a required level of service availability for the HA system and that is supported by the service-units (block 904). In one embodiment, the computer system may generate a recommendation to configure the HA system with the identified redundancy model for runtime operations.

The method 900 may be performed by hardware (e.g., circuitry, dedicated logic, programmable logic, microcode, etc.), software (e.g., instructions run on a processing device), or a combination thereof. In one embodiment, the method 900 is performed by the computer system 1000 of FIG. 10.

Figure 10:
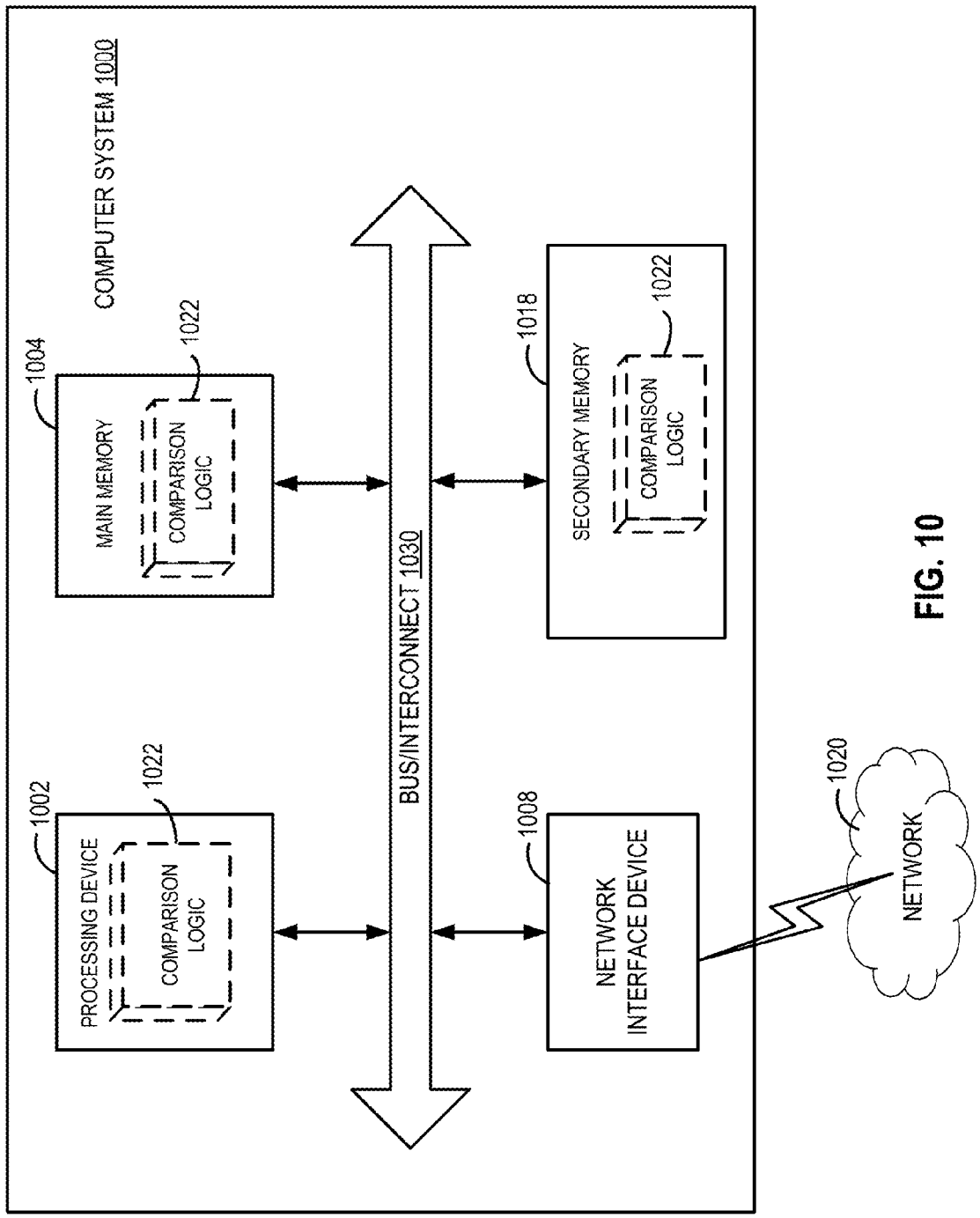
FIG. 10 illustrates a diagrammatic representation of a computer system according to one embodiment of the invention.

FIG. 10 illustrates a diagrammatic representation of a machine in the exemplary form of a computer system 1000 within which a set of instructions, for causing the machine to perform any one or more of the methodologies discussed herein, may be executed. The computer system 1000 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1000 includes a processing device 1002. The processing device 1002 represents one or more general-purpose processors, each of which can be: a microprocessor, a central processing unit (CPU), a multicore system, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In one embodiment, the processing device 1002 is adapted to execute the operations of a comparison logic 1022 which contains instructions executable by the processor device 1002, such that the computer system 1000 is adapted to execute the method 900 of FIG. 9.

In one embodiment, the computer system 1000 is adapted to compare a set of redundancy models to thereby determine or assist in determining an AMF configuration of a HA system based on quantified service availability of the HA system. The computer system 1000 is adapted to construct an analysis model of a HA system to capture recovery behaviors of the HA system for each redundancy model; quantify the service availability of the HA system based on the analysis model under one or more of a plurality of scenarios including failure scenarios and recovery scenarios; compare levels of the service availability provided by the redundancy models; and identify, based on the compared levels of the service availability, a redundancy model that provides a required level of service availability for the HA system and that is supported by the service-units. In one embodiment, the computer system may be further adapted to generate a recommendation to configure the HA system with the identified redundancy model for runtime operations.

In one embodiment, the processor device 1002 is coupled to one or more memory devices such as: a main memory 1004 (e.g., read-only memory (ROM), flash memory, dynamic random access memory (DRAM) such as synchronous DRAM (SDRAM) or Rambus DRAM (RDRAM), etc.), a secondary memory 1018 (e.g., a magnetic data storage device, an optical magnetic data storage device, etc.), and other forms of computer-readable media, which communicate with each other via a bus or interconnect 1030. The memory devices may also different forms of read-only memories (ROMs), different forms of random access memories (RAMs), static random access memory (SRAM), or any type of media suitable for storing electronic instructions. In one embodiment, the memory devices may store the code and data of the comparison logic 1022. In the embodiment of FIG. 10, the comparison logic 1022 may be located in one or more of the locations shown as dotted boxes and labeled by the reference numeral 1022. In alternative embodiments the comparison logic 1022 may be located in other location(s) not shown in FIG. 10.

The computer system 1000 may further include a network interface device 1008. A part or all of the data and code of the comparison logic 1022 may be transmitted or received over a network 1020 via the network interface device 1008. Although not shown in FIG. 10, the computer system 1000 also may include user input/output devices (e.g., a keyboard, a touchscreen, speakers, and/or a display).

In one embodiment, the comparison logic 1022 can be implemented using code and data stored and executed on one or more computer systems (e.g., the computer system 1000). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices as shown in FIG. 10 as 1004 and 1018) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the flow diagram of FIG. 9 have been described with reference to the exemplary embodiment of FIG. 10. However, it should be understood that the operations of the flow diagram of FIG. 9 can be performed by embodiments of the invention other than those discussed with reference to FIG. 10, and the embodiment discussed with reference to FIG. 10 can perform operations different than those discussed with reference to the flow diagram. While the flow diagram of FIG. 9 shows a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method for comparing a set of redundancy models to thereby determine or assist in determining an Availability Management Framework (AMF) configuration of a highly available (HA) system based on quantified service availability of the HA system, wherein each redundancy model defines assignments of a plurality of service-instances representing workload to a plurality of service-units representing resources, and wherein each service-unit represents a unit of replication in the redundancy models, the method comprising the steps of:
    constructing an analysis model of the HA system to capture recovery behaviors of the HA system for each of the redundancy models;
    quantifying the service availability of the HA system based on the analysis model under one or more of a plurality of scenarios including failure scenarios and recovery scenarios;
    comparing levels of the service availability provided by the redundancy models; and
    identifying, based on the compared levels of the service availability and subject to constraints of the HA system, one of the redundancy models that provides a required level of service availability for the HA system.

2. The method of claim 1, further comprising the step of: generating a recommendation for configuring the HA system with the identified redundancy model for runtime operations.

3. The method of claim 1, further comprising the step of: determining impacts of improving Mean Time to Failure (MTTF) and Mean Time to Recover (MTTR) on the service availability for each of the redundancy models.

4. The method of claim 1, further comprising the step of: determining impacts of workload on the service availability for each of the redundancy models.

5. The method of claim 1, wherein the redundancy models include two or more of a group of redundancy models including N+M redundancy, 2N redundancy, Nway redundancy, NwayActive and No-Redundancy.

6. The method of claim 1, wherein the analysis model uses guards and transition rates of a Deterministic and Stochastic Petri Nets (DSPNs) to capture differences in the redundancy models.

7. The method of claim 1, further comprising the steps of: ranking the redundancy models based on the levels of the service availability provided by the redundancy models; and
    choosing a highest ranking redundancy model as the identified redundancy model.

8. The method of claim 1, wherein the analysis model includes a node model that further includes at least a healthy state, a failing-fast state and a failing-over state, and wherein transition rates among the healthy state, the failing-fast state and the failing-over state depend on MTTF.

9. The method of claim 1, wherein the analysis model includes a component model that further includes at least an un-instantiated state, an instantiated state, a failing-over state and a restarting state, and wherein transition rates among the instantiated state, the failing-over state and the restarting state depend on MTTF.

10. The method of claim 1, wherein, for a given service instance, the analysis model includes a service-unit_service-instance model that further includes at least an SI_provided state for each service unit and an SI_not_provided state, and wherein transition to the SI_not_provided state is triggered by failure of a component serving the given service instance.

11. A computer system adapted to compare a set of redundancy models to thereby determine or assist in determining an Availability Management Framework (AMF) configuration of a highly available (HA) system based on quantified service availability of the HA system, wherein each redundancy model defines assignments of a plurality of service-instances representing workload to a plurality of service-units representing resources, and wherein each service-unit represents a unit of replication in the redundancy models, the computer system comprising a processor and a memory, the memory containing instructions executable by the processor whereby the computer system is operative to:
    construct an analysis model of the HA system to capture recovery behaviors of the HA system for each of the redundancy models;
    quantify the service availability of the HA system based on the analysis model under one or more of a plurality of scenarios including failure scenarios and recovery scenarios;
    compare levels of the service availability provided by the redundancy models;
    identify, based on the compared levels of the service availability and subject to constraints of the HA system, one of the redundancy models that provides a required level of service availability for the HA system.

12. The computer system of claim 11, wherein the computer system is further adapted to generate a recommendation for configuring the HA system with the identified redundancy model for runtime operations.

13. The computer system of claim 11, wherein the computer system is further adapted to determine impacts of improving Mean Time to Failure (MTTF) and Mean Time to Recover (MTTR) on the service availability for each of the redundancy models.

14. The computer system of claim 11, wherein the computer system is further adapted to determine impacts of workload on the service availability for each of the redundancy models.

15. The computer system of claim 11, wherein the redundancy models include two or more of a group of redundancy models including N+M redundancy, 2N redundancy, Nway redundancy, NwayActive and No-Redundancy.

16. The computer system of claim 11, wherein the analysis model uses guards and transition rates of a Deterministic and Stochastic Petri Nets (DSPNs) to capture differences in the redundancy models.

17. The computer system of claim 11, wherein the computer system is further adapted to:
    rank the redundancy models based on the levels of the service availability provided by the redundancy models; and
    choose a highest ranking redundancy model as the identified redundancy model.

18. The computer system of claim 11, wherein the analysis model includes a node model that further includes at least a healthy state, a failing-fast state and a failing-over state, and wherein transition rates among the healthy state, the failing-fast state and the failing-over state depend on MTTF.

19. The computer system of claim 11, wherein the analysis model includes a component model that further includes at least an un-instantiated state, an instantiated state, a failing-over state and a restarting state, and wherein transition rates among the instantiated state, the failing-over state and the restarting state depend on MTTF.

20. The computer system of claim 11, wherein, for a given service instance, the analysis model includes a service-unit_service-instance model that further includes at least an SI_provided state for each service unit and an SI_not_provided state, and wherein transition to the SI_not_provided state is triggered by failure of a component serving the given service instance.

* * * * *